(12) United States Patent
Bean et al.

(10) Patent No.: US 10,568,034 B2
(45) Date of Patent: Feb. 18, 2020

(54) INTELLIGENT POWER MANAGEMENT FOR MONITORING A MOVABLE OBJECT

(71) Applicant: Blustream Corporation, Worcester, MA (US)

(72) Inventors: Robert Bean, Sandwich, MA (US); Michael Dominick Audi, Worcester, MA (US); James Michael Gordon, Jr., Worcester, MA (US); Kenneth N. Rapp, Sutton, MA (US); William Buote, Bellingham, MA (US)

(73) Assignee: Blustream Corporation, Worcester, MA (US)

( * ) Notice: Subject to any disclaimer, the term of this patent is extended or adjusted under 35 U.S.C. 154(b) by 0 days.

(21) Appl. No.: 16/070,429

(22) PCT Filed: Jan. 23, 2017

(86) PCT No.: PCT/US2017/014516
§ 371 (c)(1),
(2) Date: Jul. 16, 2018

(87) PCT Pub. No.: WO2017/127787
PCT Pub. Date: Jul. 27, 2017

(65) Prior Publication Data
US 2019/0069243 A1   Feb. 28, 2019

Related U.S. Application Data

(60) Provisional application No. 62/286,312, filed on Jan. 23, 2016.

(51) Int. Cl.
*H04W 52/02* (2009.01)
*H04W 4/80* (2018.01)
(Continued)

(52) U.S. Cl.
CPC .......... *H04W 52/0254* (2013.01); *G06F 1/28* (2013.01); *G06F 1/3209* (2013.01); *H04W 4/80* (2018.02); *Y02D 70/00* (2018.01)

(58) Field of Classification Search
CPC . H04W 52/00; H04W 52/02; H04W 52/0251; H04W 52/0254; H04W 52/0261;
(Continued)

(56) References Cited

U.S. PATENT DOCUMENTS

2006/0195258 A1    8/2006  Kim et al.
2007/0195074 A1*   8/2007  Gelissen ............... G06F 1/3228
                                                        345/204

(Continued)

OTHER PUBLICATIONS

International Search Report and Written Opinion for Application No. PCT/US17/14516, dated Apr. 14, 2017. (17 Pages).

*Primary Examiner* — Devan A Sandiford
(74) *Attorney, Agent, or Firm* — Mintz Levin Cohn Ferris Glovsky and Popeo, P.C.

(57) ABSTRACT

Sensor data characterizing an event associated with a movable object is received. Based on the sensor data, an objective from a plurality of predefined objectives for monitoring the movable object is selected. A series of operational states having increasing power requirement levels is transitioned through. At each operational state, whether the selected objective is achievable using a respective method associated with the respective operational state and respective power requirement level is determined. Related apparatus, systems, techniques and articles are also described.

26 Claims, 13 Drawing Sheets

(51) Int. Cl.
*G06F 1/28* (2006.01)
*G06F 1/3209* (2019.01)

(58) Field of Classification Search
CPC .......... H04W 52/0274; H04N 1/00891; H04M 1/73; H04B 1/1615
See application file for complete search history.

(56) References Cited

U.S. PATENT DOCUMENTS

| | | |
|---|---|---|
| 2011/0053506 A1 | 3/2011 | Lemke et al. |
| 2012/0147802 A1 | 6/2012 | Ukita et al. |
| 2013/0164712 A1 | 6/2013 | Hunt et al. |
| 2013/0181834 A1 | 7/2013 | Bentley et al. |
| 2013/0210408 A1* | 8/2013 | Hohteri ................ G06F 1/3231 455/418 |
| 2014/0028462 A1* | 1/2014 | Lawson ................ G08C 17/02 340/870.01 |
| 2014/0094198 A1 | 4/2014 | Heo et al. |
| 2015/0038818 A1 | 2/2015 | Cole |
| 2015/0068069 A1 | 3/2015 | Tran et al. |
| 2015/0098354 A1* | 4/2015 | Perez Grovas ....... H04W 24/04 370/253 |
| 2015/0301167 A1 | 10/2015 | Sentelle et al. |
| 2015/0312863 A1* | 10/2015 | Shen ..................... G01S 19/34 455/574 |
| 2015/0382160 A1 | 12/2015 | Slay, Jr. et al. |
| 2016/0018879 A1* | 1/2016 | Hsiao ................... G06F 1/3234 713/324 |
| 2016/0116960 A1* | 4/2016 | Kwak ................... G06F 1/3206 713/323 |
| 2016/0284184 A1* | 9/2016 | Bean .................. G08B 21/0277 |

\* cited by examiner

| Event | State | Description | Alert |
|---|---|---|---|
| Device is not moving & in wireless range | Sleep | The device is in its lowest power state. The position is known and it's not moving | No |
| Device moves and is in wireless range | Communication | The device is in a wireless range and it moves. The device communicates the event via the wireless radio and the central notification service alerts owners | Yes Motion Alert |
| Device is not moving but the wireless range moves away from it breaking connection | Sleep | The device is in its lowest power state. The position is known (last location) and it's not moving | Yes Connection Alert |
| Device moves and is not in wireless connection | Awake | The device wakes up and tries to find a wireless connection. | No |
| Device does not move and is already outside of wireless range | Sleep | The device is in its lowest power state. | No |

FIG. 9

| Cause | State | Description | Alert | Safe |
|---|---|---|---|---|
| Device is not moving & in wireless short range | Sleep | The device is in its lowest power state. The position is known and it's not moving. | No | Yes |
| Device moves slightly | Low Power Positioning | The device hardly moved. The position change is considered negligible. | No | Yes |
| Device moves substantially and is in wireless short range | Medium Power Positioning | The device has moved but it is still within the short range wireless zone and considered safe | No | Yes |
| Wireless zone moves out of range of the device but the device does not move | Sleep | The device was in range but has not moved, the zone moved out of range. | Yes | Device is considered lost |
| Device moves substantially and is not in wireless short range and the position is not yet known | High Power Positioning | The device is moving and is out of range of all safe short range wireless zones. | No | Device is considered stolen |
| Device moves substantially and is not in wireless short range and the position is known | High power long range communication | The device is moving and out of range but the position has been determined | Yes | Device is considered stolen |

INTELLIGENT POWER MANAGEMENT FOR MONITORING A MOVABLE OBJECT

RELATED APPLICATIONS

This application is a national stage application, filed under 35 U.S.C. § 371, of International Application No. PCT/US17/14516, filed on Jan. 23, 2017 which claims the benefit of, and priority under 35 U.S.C. § 119(e) to U.S. Provisional Patent Application No. 62/286,312 filed Jan. 23, 2016, the entire contents of each which is hereby expressly incorporated herein.

TECHNICAL FIELD

The subject matter described herein relates to intelligent power management for monitoring a movable object.

BACKGROUND

Sensors are an integral part of modern electronic devices such as cellphones, automobile circuitry, and the like. A sensor can detect a physical property such as motion, temperature, position, and the like, and generate a signal that represents the detected physical property. The generated signal can be processed and stored by a computing device. Sensors require power to operate which can be obtained, for example, by a battery. The battery can discharge over a period of time and has to be replaced or recharged. Failure to do so can render the sensor inoperable and disrupt the operation of an electronic device that relies on the sensor for data.

SUMMARY

In an aspect, sensor data characterizing an event associated with a movable object is received. An objective from a plurality of predefined objectives for monitoring the movable object is selected based on the sensor data. A series of operational states having increasing power requirement levels is transitioned through. At each operational state whether the selected objective is achievable using a respective method associated with the respective operational state and respective power requirement level is determined.

In another aspect, a system includes a sensor and processing circuitry. The sensor is configured to generate sensor data characterizing an event associated with a movable object. The processing circuitry is configured to select, based on the sensor data, an objective from a plurality of predefined objectives for monitoring the movable object and transition through a series of operational states having increasing power requirement levels, and at each operational state determine whether the selected objective is achievable using a respective method associated with the respective operational state and respective power requirement level.

One or more of the following features can be included in any feasible combination. For example, the sensor data can include data associated with one or more of a timer, an accelerometer, a global positioning system, a position sensor, a thermometer, a humidity sensor, pressure sensor, voltage sensor, current sensor, wind speed sensor, mass spectrometer and infrared sensors. The event can include one or more of end of a time duration, movement of the movable object, change in surrounding temperature, surrounding humidity and detection of chemical properties of the movable object.

The selected objective can include determination of a location of the movable object. The respective method associated with the respective operational state can include one or more of nine-degree-of-freedom (DoF) Kalman filtering, three-degree-of-freedom Kalman filtering, time of flight detection, range finding, pressure sensing, short-range wireless positioning and global positioning.

The selected objective can include communication of the received sensor data. The respective method associated with the respective operational state can include communication using Bluetooth, WiFi, LPWAN, SigFox, RF communication protocol and/or cellular protocol. Receiving a portion of the sensor data can cause a transition from a sleep state to a communication state. The selected objective can include establishing a wireless connection with the device from a plurality of predetermined devices using a short-range wireless protocol.

Transitioning through the series of operational states can include transitioning between a sleep state and a communication state. The communication state can include communicating sensor data to the device. The selected objective can further include determining a distance between one or more pre-determined devices and the movable object.

A user device associated with the movable object can be notified, by a central server in communication with the devices, and based on a strength of the wireless connection. A predetermined device can be searched for using a short-range wireless protocol. The sensor data can include data from a motion detector. The selected objective can include monitoring motion of the movable object and the series of operational states include a sleep state, a short-range wireless communication state and a cellular communication state. The transitioning between the sleep state and the short-range wireless communication state upon receiving the data from the motion sensor and transitioning between the short-range wireless communication state and the cellular communication state can be based on an availability of the predetermined receiver. A user device can be notified, by a central server in communication with one of the predetermined device and the movable object, with information related to the data from the motion sensor.

The short-range and cellular communication states can include transmitting the received data from the motion sensor. The motion detector can include one or more of a 3 degree-of-freedom inertia measurement unit, a 9 degree of freedom inertial measurement unit, a limit switch, a range finder, a barometer, a gyroscope, a 1-axis accelerometer and a magnetometer.

The received sensor data can be analyzed by an analytics engine to determine behavior of the movable object. The selected objective can include establishing a plurality of wireless connections with a plurality of receivers. A location can be determined based on strengths of the plurality of wireless connections and locations of the plurality of receivers.

The sensor can include one or more of a timer, an accelerometer, a global positioning system, a position sensor, a thermometer, a humidity sensor, pressure sensor, voltage sensor, current sensor, wind speed sensor, mass spectrometer and infrared sensors. A radio can be included. The selected objective can include establishing a wireless connection with device from a plurality of predetermined devices using a short-range wireless protocol. The processing circuitry can be configured to notify, using the radio and by a central server in communication with the devices, a user device associated with the movable object based on a strength of the wireless connection. The processing circuitry can be configured to search for a predetermined device using a short-range wireless protocol.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 9 illustrates a table with examples of operational states of an embodiment of motion triggered monitoring device;

FIG. 10 illustrates a table with examples of operational states of an embodiment of find-it monitoring device;

Like reference symbols in the various drawings indicate like elements.

DETAILED DESCRIPTION

Monitoring devices powered by batteries are commonly used to detect motion and location of valuable objects. A monitoring device can include sensors, radio systems and processors that can consume power, and thereby deplete the batteries of the monitoring device. As a result, the batteries need to be recharged and/or replaced on a regular basis. This can impede the usage of the monitoring device over an extended period of time. Battery life can be extended by intelligent management of power resources. The operation of the monitoring device can be divided into multiple operational states, each of which is configured to perform a desired operation and have a different power consumption requirement. The power consumption of the monitoring device can be reduced by intelligently selecting the operational states that can achieve a desired objective, and transitioning from a low power consuming operational state to a high power consuming operational state only when required to achieve the desired objective. Behavior of a movable object can be monitored through effective power management of the monitoring devices to gather information about the movable object, and by using the gathered data in an analytics engine.

Figure 1:
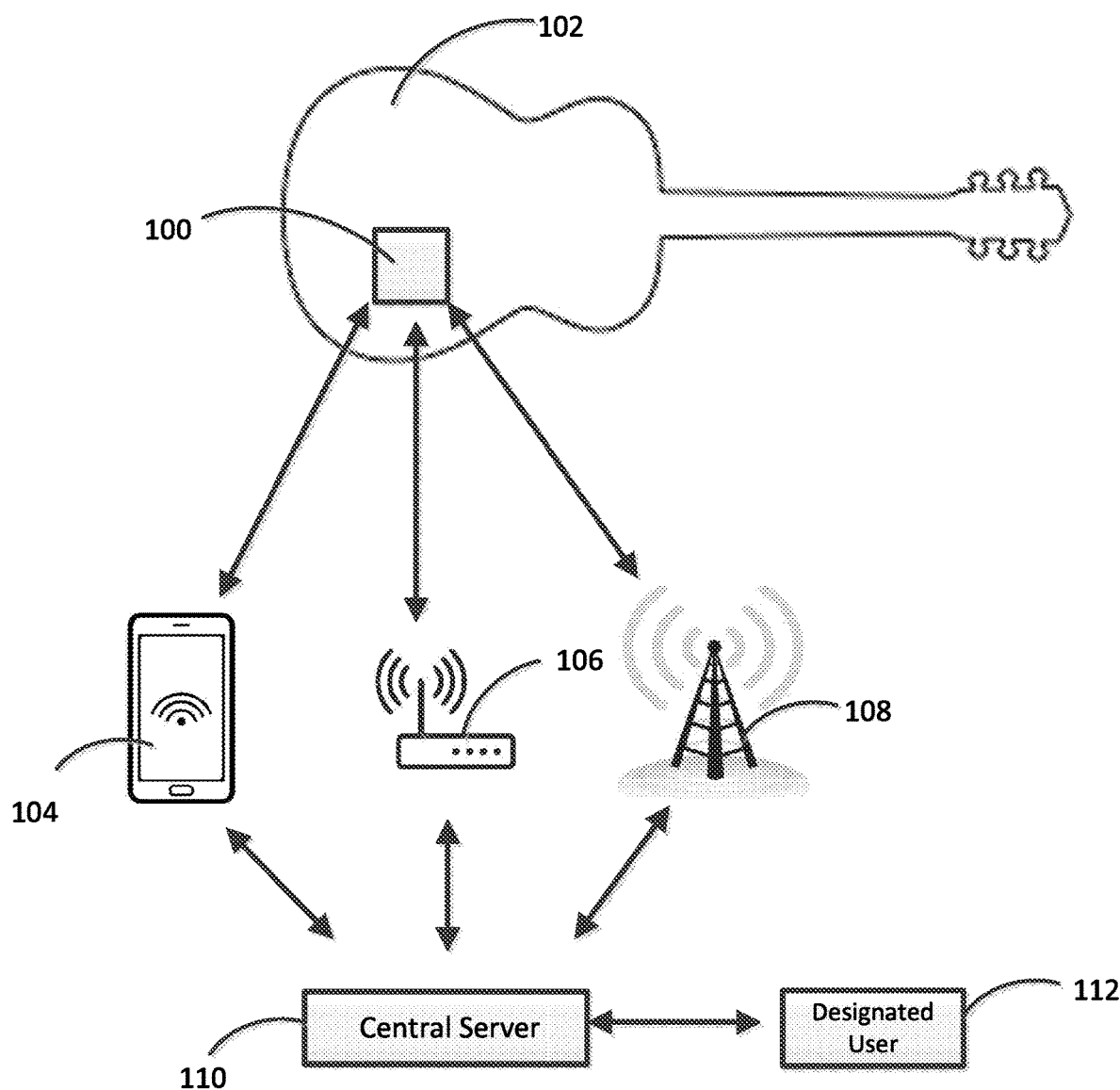
FIG. 1 illustrates a monitoring system for monitoring a movable object, such as a guitar.

FIG. 1 illustrates an embodiment of a monitoring system for monitoring a movable object, such as, for example, a guitar. It will be well understood that the monitoring system can be used to track any movable object. The monitoring system includes a monitoring device 100 attached to a guitar, for example, by magnets, hook and loop, fasteners such as Velcro patches and/or adhesives. The monitoring device 100 can detect various properties associated with the guitar and/or the surrounding. For example, the monitoring device 100 can detect and generate data relating to one or more parameters, such as position and/or motion associated with the guitar, ambient temperature, ambient humidity, soil moisture, wind speed, electromagnetic radiation (e.g., ultraviolet, infrared), sound, pressure (absolute or relative for vertical positioning), low solar voltage, magnetometer, 3-axis gyro, impacts, dust, air contamination, gas (e.g., $CO_2$, methane), battery life, voltage, strain, ultrasonic and infrared range, time of flight, and the like. The monitoring device 100 can communicate wirelessly with external devices/networks through various short-range (e.g. Bluetooth, Wi-Fi, etc.) and/or long-range communication protocols (e.g. global system of mobile communication (GSM)). For example, it can communicate with a mobile device 104 by Bluetooth, an internet router 106 (e.g., by Wi-Fi), and a cellular network 108 (e.g., by GSM communication) or the like. Data exchanged between the monitoring device 100 and the external device/network can be communicated to a central server 110 that can store and/or process the exchanged data. The central server 110 can act as a liaison between the monitoring system 100 and one or more designated users of the monitoring system 100 (e.g., designated user 112). For example, the central server 110 can notify the designated user 112 when a predetermined event associated with the movable object 102 is detected. The designated user 112 can modify the operation of the monitoring system 100. For example, the designated user 112 can select a mode of operation the monitoring system from a predetermined set of modes, add new designated users, remove existing designated users, and the like.

In some implementations, the monitoring device 100 can detect events/physical properties associated with the movable object 102 based on its communication with the external devices/networks. For example, the monitoring device 100 can detect the location of the movable object 102 by using a global positioning system that relies on the satellite communication. In another embodiment, the monitoring system 100 can detect the relative position of the movable object 102 with respect to an external device (e.g., a mobile device 104, an internet router 106, and the like) based on the strength of the wireless signal between them.

Figure 2:
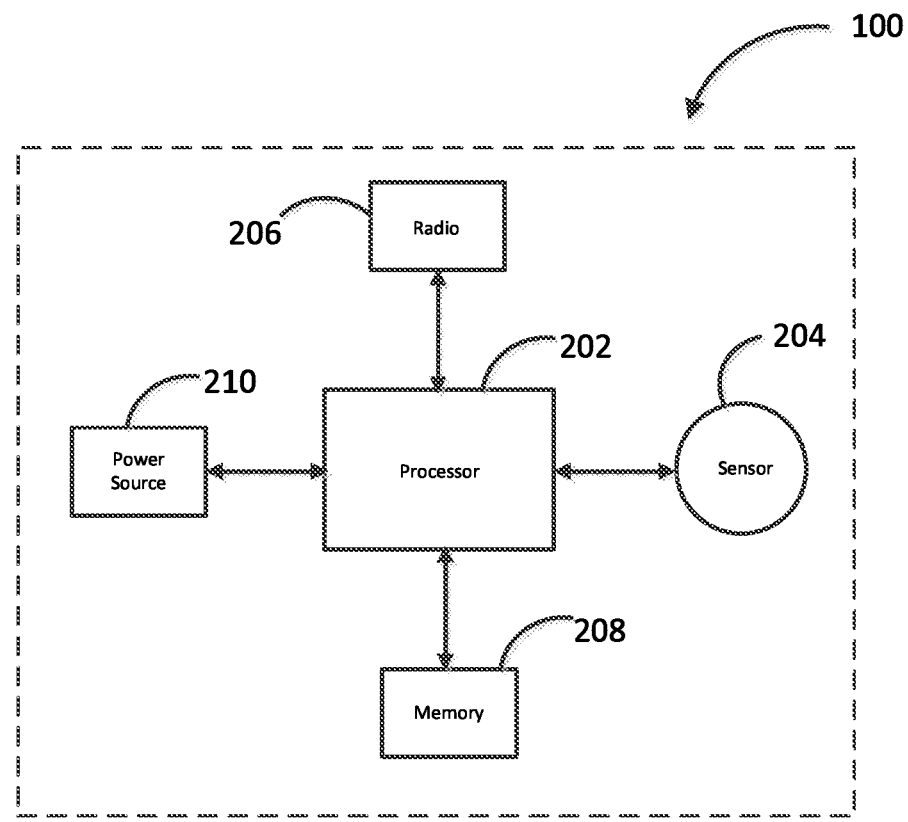
FIG. 2 illustrates the components of a monitoring device in the monitoring system of FIG. 1.

FIG. 2 illustrates an example implementation of the monitoring device 100. The example monitoring device 100 includes a processor 202 that is communicatively coupled with a sensor 204, a radio 206 and a memory 208. The monitoring device 100 can also include a power source 210 that supplies power to the various components of the monitoring device 100. The sensor 204 can, for example, include an accelerometer, a position sensor, a humidity sensor, a global positioning system, a timer, and other sensors to detect the above-mentioned physical and chemical properties in the discussion of FIG. 1. The sensor 204 can detect an event (e.g., motion of the monitoring device 100, ambient temperature/humidity or change thereof) and notify the processor 202. The processor 202 can be configured to operate in various operational states that perform different functionalities and have different power requirements. The details of the operational states of the processor 202 will be later discussed. The processor 202 can transition from a sleep state to an awake state upon receiving a signal from the sensor 204. The processor 202 can process the information related to the signal from the sensor 204 and/or store the information in the memory 208. The processor 202 can send a signal to the radio 206 with instructions to communicate with an external device/network. The radio 206 can send/receive wireless signals using short-range wireless communication protocols (e.g., Bluetooth and Wi-Fi) and/or long-range wireless communication protocols (e.g., cellular). For example, the radio can send information related to the event detected by the sensor 204, receive data/instructions from the mobile device 104 or central server 110, receive information related to the position of the monitoring device 100 from the cellular network or via GPS, and the like. In some implementations, radio 206 can include multiple radios. The power consumed by the radio can depend, for example, on its operational state, e.g., on the type of communication protocol used to send/receive wireless signal. For example, GSM (cellular) can be more power intensive compared to short-range communication protocols, and Wi-Fi can be more power intensive than Bluetooth.

The power source 210 supplies power to the above-mentioned components of the monitoring device 100. The power source 210 can include, for example, a rechargeable battery. In some embodiments, the power source 210 can receive power from an external power source (e.g., external alternate current or direct current power source) to power the monitoring device components and/or charge the rechargeable battery therein.

Figure 3:
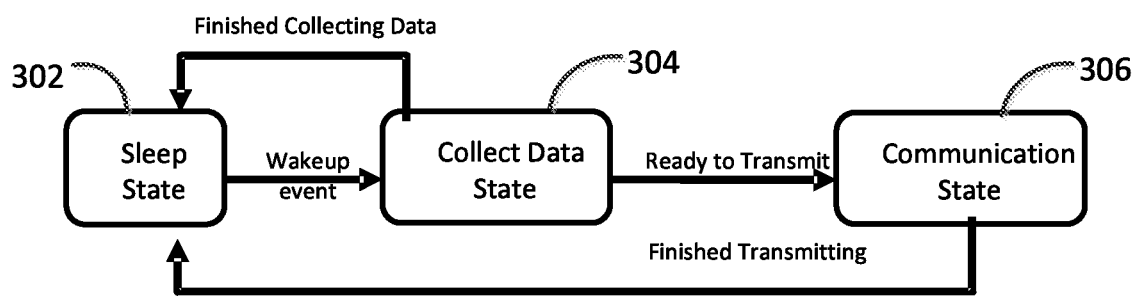
FIG. 3 illustrates an example of intelligent power management of the monitoring device.

FIG. 3 illustrates an example of intelligent power management of the monitoring device by transitioning between operational states that have different power requirement levels. The operational states of the monitoring device can depend on the processes performed by the various components of the monitoring device in that state, for example, the processes performed by the processor, the communication protocol used by the radio, the event being detected by the sensor, and the like. The monitoring device can transition from an operational state with low power consumption to an operational state with higher power consumption when needed (e.g., to perform a predetermined task) and return back to the low power operational state. This can reduce the power consumption of the monitoring device over a period of time, and can increase the lifetime of the power source in the monitoring system.

As shown in FIG. 3, the monitoring device transitions from a sleep state 302 to a collect data state 304 after a wakeup event. In the sleep state the monitoring device performs minimum operations, and the power requirement of the monitoring device is the smallest. The wakeup event can include, for example, a signal from a timer received by the processor at a regular interval, detection of an event by the sensor 204 (e.g., motion of the monitoring device, change or rate of change in temperature/humidity above a threshold value, change in a wireless signal detected by the radio, and the like). After waking up, the monitoring device transitions to the collect data state 304 in which it begins to collect data using the sensor 204. In the collect data state 304, the sensor 204 takes measurements of the event, and sends a signal to the processor 202 with the measured data related to the event. In some embodiments, the processor 202 can save the measured data in the memory 208 and/or process it based on predetermined instructions. After the sensor completes the collection of data, the monitoring device can return back to the sleep state. If the processor 202 has been programmed/instructed to communicate the measured data to an external device, the monitoring device transitions to a communication state 306. The processor 202 can be programmed/instructed to communicate based on the measured data, for example, when the measured data exceeds a threshold value. In the communication state 306, the monitoring device can transmit the measured data and/or data related to the measured data (e.g., data obtained by processing the measured data by the processor 202) using the radio 206 to one or more external devices/networks. The processor 202 can determine the operational state of the radio (e.g., Bluetooth, Wi-Fi, GSM, etc.). After the data has been transmitted, the monitoring device can transition back to the sleep state.

Figure 4:
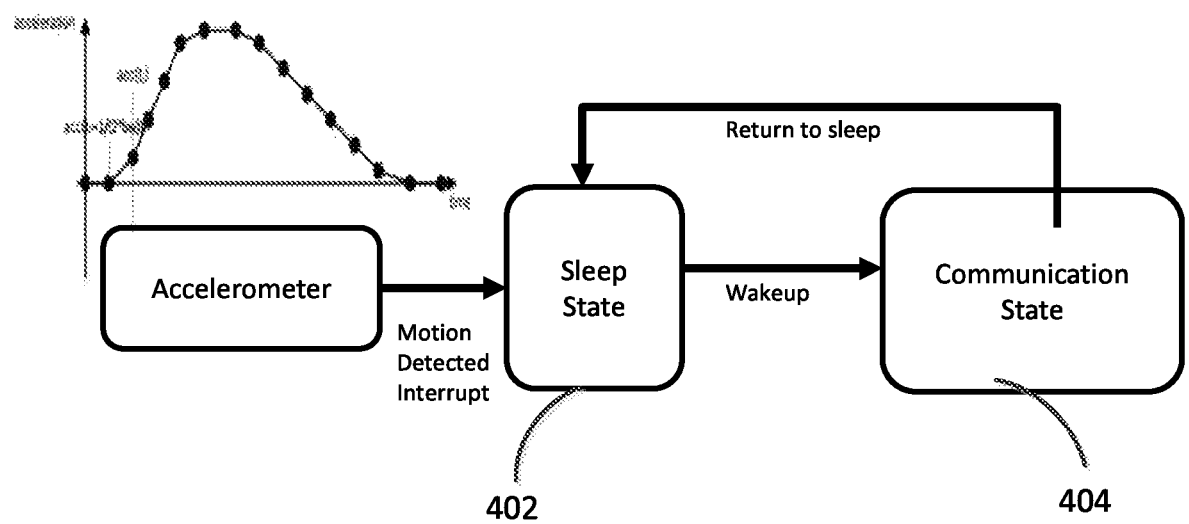
FIG. 4 illustrates an example of a wakeup event for the monitoring device.

FIG. 4 illustrates an example of a wakeup event that can lead to the transition of operational states of a monitoring device. In this example, the wakeup event is the motion of the monitoring device (and therefore the object (e.g., guitar) to which the monitoring device is attached to) detected by an accelerometer in the monitoring device. In some implementations, motion of the monitoring device can be deemed as a wakeup event based on predetermined threshold criteria. For example, a wakeup event can be considered to have occurred when the distance, velocity, acceleration or change of acceleration detected by the accelerometer is above a threshold value. The accelerometer can send a signal to the processor notifying it of the occurrence of the wakeup event. On receiving the notification signal, the monitoring device transitions to a communication state 404 in which data associated with the detected motion is communicated to an external device/network. After the data associated with the detected motion has been communicated or after a predetermined duration of time has elapsed, the monitoring device 100 can return back to the sleep state 402.

The monitoring device 100 can wake up from the sleep state to the communication state (or collect data state) based on the signal (referred to as "interrupt") from the sensor (e.g., accelerometer). The interrupt can be transmitted from the sensor to an interrupt pin of the processor. The other pins of the processor can be used as inputs and outputs of analog to digital conversion (ADC), supply of power to the processor, reset pin, and the like. The other pins can act as the "interrupts" or wakeups for the processor. For example, a sensor can trigger a switch which powers the processor. Based on this trigger, the processor can collect data from the sensor. In some embodiments, the monitoring device 100 can wake up based on a software interrupt, for example a timer. The monitoring device 100 can be configured to wake up based on more than one interrupt. The monitoring device can be configured to add new wake up events, disable existing wakeup events, or change the priority of the wakeup events. This can be done, for example, by sending an instruction signal wirelessly through the radio of the monitoring device to the processor.

Figure 5:
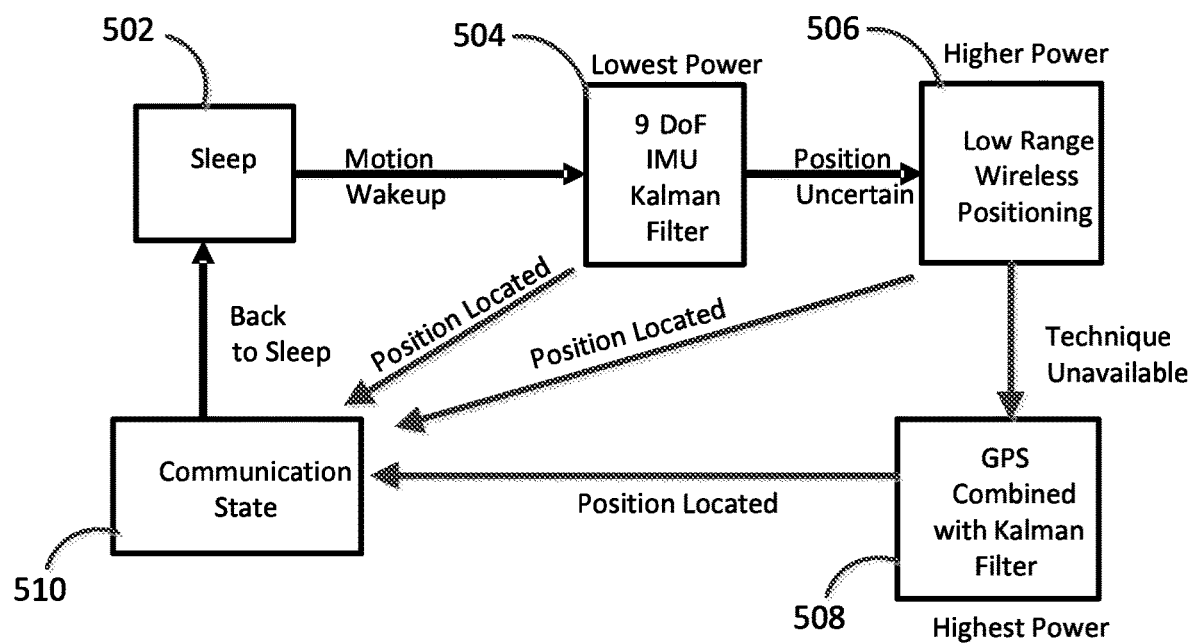
FIG. 5 is a flowchart illustrating the transition between the various position locating states of the monitoring device.

FIG. 5 is a flowchart illustrating the transition between various position locating states of a monitoring device. The monitoring device 100 can wake up into a position locating state in which the monitoring device attempts to determine its position. The monitoring device 100 can transition through various position location states (e.g., operational states) that use various position locating techniques (based on, for example, respective state logic) to determine the position of the monitoring device 100. Different position locating states can have varying power requirements, and can determine the position of the monitoring device 100 with varying accuracy. The monitoring device 100 can be configured to start in a position locating state with lowest power requirement. The monitoring device 100 can transition to a different position locating state if, for example, the accuracy (or confidence) of the measured position is below the desired value and/or if excess power resources are available to the monitoring device 100. The monitoring device 100 can transition to a different position locating states that can detect the position with higher accuracy. Transition from one position locating state to another can continue until the desired position accuracy is achieved. Transition to operational states with higher accuracy can result in an increase in consumption of power. For example, the accuracy of an operational state can be proportional to the power consumed by the operational state. After the position of the monitoring device 100 has been detected with desired accuracy, the monitoring device 100 can transition back to the sleep state or transition to a communication state in which the detected location data is transmitted to an external device/network. In some implementations, the monitoring device can skip an operational state that may not be available. For example, if a position locating state requires a Wi-Fi connection to a router, and no Wi-Fi connection is available, the monitoring device can skip the Wi-Fi related position locating state. However, if at a later time, a Wi-Fi connection were to become available, the monitoring device can transition back to it.

As illustrated in FIG. 5, in some implementations, the monitoring device 100 can wake up from a sleep state 502 to a position locating state 504 that employs a nine-degree-of freedom (9 DoF) inertial measuring unit (IMU). Data measured by the 9 DoF IMU can be used by an Extended Kalman filter to detect a position. If the accuracy of the detected position in the state 504 is insufficient, the monitoring device can transition to a low-range wireless positioning state 506 that consumes more power compared to the position locating state 504 but is more accurate. If a short range wireless signal is unavailable, the monitoring device 100 can transition to a position locating state 508 that uses a global positioning system (GPS) sensor. Data from the GPS sensor can be processed by a Kalman filter, the extended Kalman filter, or any other estimation algorithm to calculate the position. The monitoring device 100 can transition to the communication state 510 from any of the aforementioned position locating states 504, 506 and 508. After the location data have been communicated, the monitoring device 100 can transition back to the sleep state 502. The monitoring device 100 can be configured to process the position data, for example, position data calculated over a period of time, to determine the velocity, trajectory, direction of travel, and the like, of the monitoring device 100. Based on the measured position data and/or data calculated from the position data, the monitoring device 100 can transition to a predetermined operational state. For example, a monitoring device moving back and forth with a confined state, with velocity approaching zero, or heading towards a previously known location can be configured to transition to the sleep state.

Figure 6:
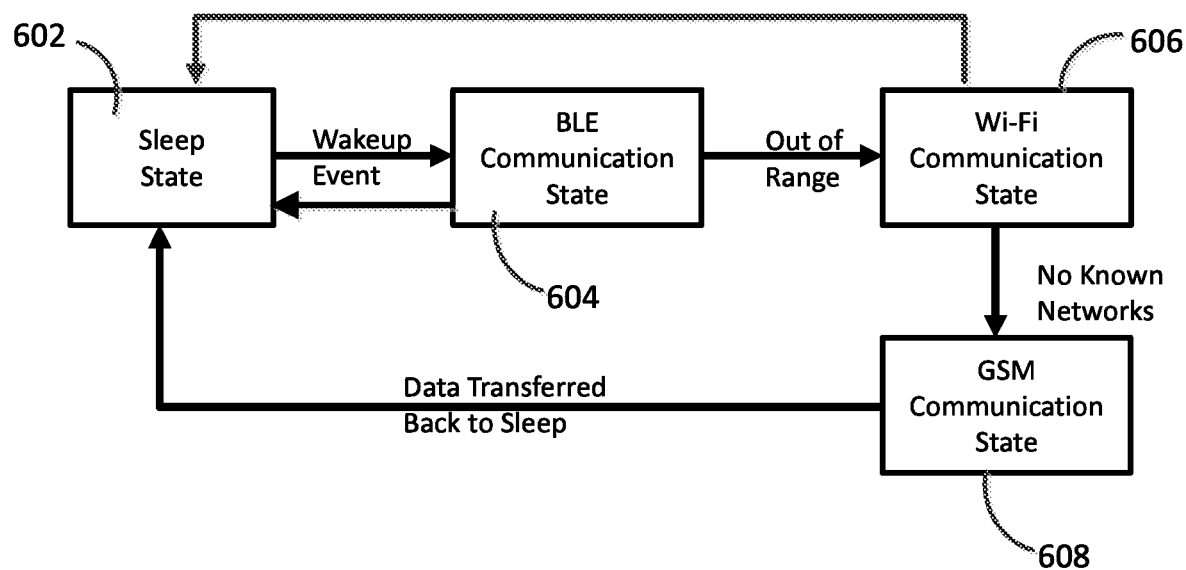
FIG. 6 is a flowchart illustrating the transition between the various communication states of the monitoring device.

FIG. 6 is a flowchart illustrating the transition between the various communication states of a monitoring device. The monitoring device can transition to a Bluetooth low energy (BLE) communication state 604 from a sleep state 602 upon the occurrence of a wakeup event. The BLE communication state consumes less power compared to other communication states. In the BLE communication state, the monitoring device attempts to establish a Bluetooth connection with a predetermined mobile device (e.g., cellphone, laptop, etc.). If a Bluetooth connection is unavailable, the monitoring device can transition to a Wi-Fi communication state 606 in which the monitoring device attempts to establish Wi-Fi connection to a predetermined router. If the no accessible Wi-Fi connection is available, the monitoring device can transition to the GSM communication state 608. The monitoring device can transition back to the sleep state 602 from any communication state (604, 606, 608) in which a wireless connection is successfully established and the desired data is transferred/received. A communication state can be skipped if it is known beforehand that the communication method associated with the communication state (e.g., Bluetooth, Wi-Fi, GSM) is unavailable.

Figure 7A:
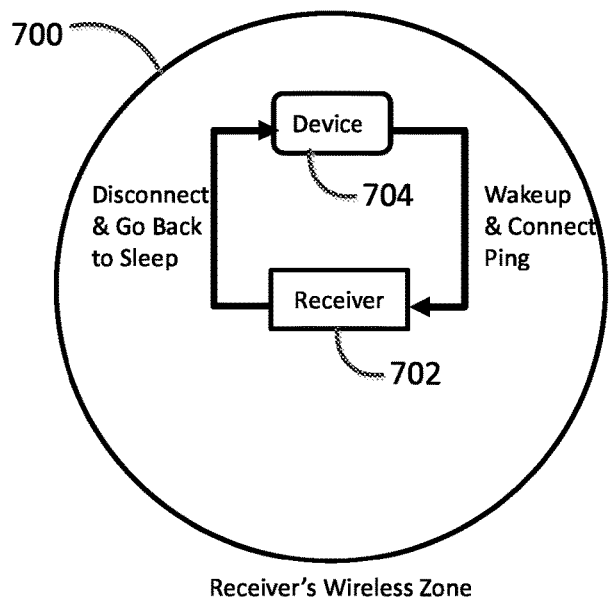
FIG. 7A illustrates a monitoring device in a wireless zone of a receiver.

FIG. 7A illustrates an example of a wireless zone 700 associated with a receiver 702. The wireless zone 700 of the receiver 702 can include an area surrounding the receiver 704 in which the strength of short-range communication signal (e.g., Bluetooth, Wi-Fi) associated with the receiver 702 is above a threshold value and can be detected by the device 704. The monitoring device 704 can wake up (e.g., after a wakeup event, passage of a predetermined duration of time tracked by a timer) and transition to a connection state in which it attempts to connect using short-range wireless technology with a predetermined receiver. For example, the monitoring device 704 can attempt to establish a short-range wireless connection with the receiver 702 if the latter is designated as a predetermined receiver. If the attempt is successful, the monitoring device 704 can determine that it is located in the safe zone 700, disconnect from the receiver 702 and return back to the sleep state. If the monitoring device 704 is unable to connect with the predetermined receiver (e.g., when the monitoring device 704 is out of the wireless zone 700, when the monitoring device 704 is not designated as a predetermined device, and the like), it can periodically wake up and attempt to establish a wireless connection. The wake up time can be based on past events, for example, previous motion, time and duration of previous wireless connection, and the like. If the attempt is successful, the monitoring device can save the information related to the connected receiver and transition back to the sleep state. If the monitoring device 704 detects more than one predetermined receivers, it can choose a receiver based on, for example, the strength of wireless signal from the receiver, previous instructions from a user associated with the monitoring device 704, and the like. If the attempt is unsuccessful, the monitoring device 704 can transition to the sleep state and attempt to connect at a later time. The monitoring device 704 can attempt to communicate using the long-range wireless communication protocol if short-range wireless communication fails over a predefined period of time. The monitoring system (e.g., a receiver 712) can alert a user if no communication has been established with the monitoring device 704 over an extended period of time.

Figure 7B:
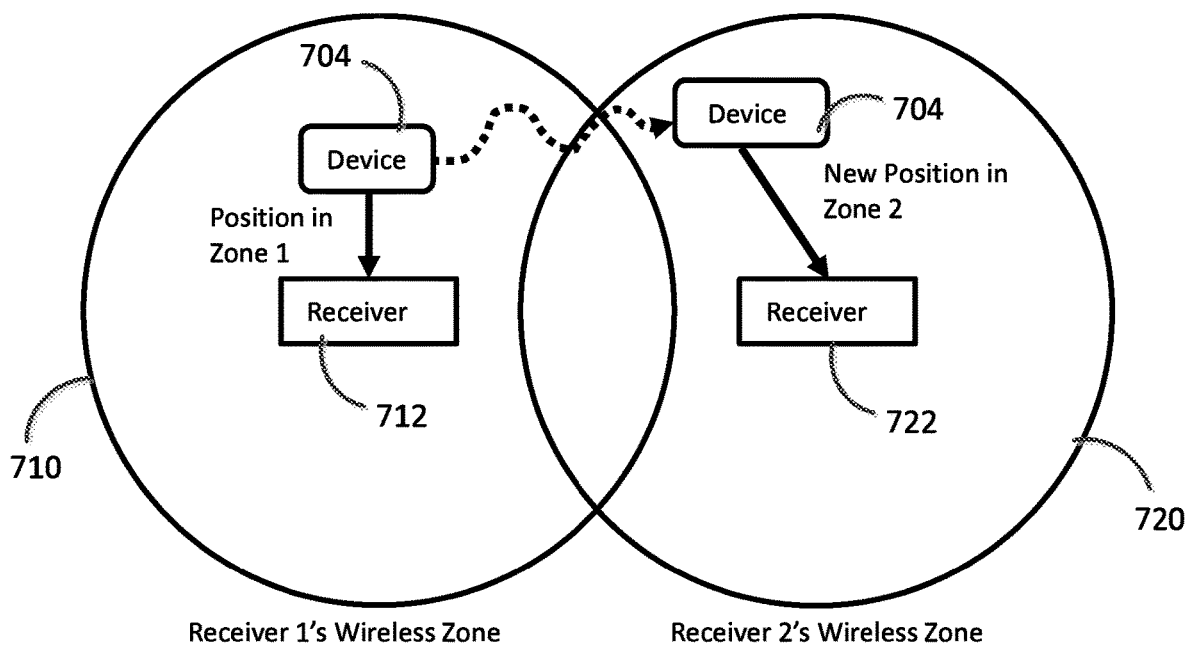
FIG. 7B illustrates a monitoring device transitioning from a first wireless zone of a first receiver to a second wireless zone of a second receiver.

FIG. 7B illustrates an example of a monitoring device 704 transitioning from a first wireless zone 710 associated with the receiver 712 to a second wireless zone 720 associated with a second receiver 722. As shown in FIG. 7B, due to proximity between the receivers 712 and 722, their respective wireless zones overlap. As the monitoring device 704 transitions from the first wireless zone 710 to the second wireless zone 720, the wireless connection of the monitoring device 704 switches from the first receiver 712 to the second receiver 722. In some implementations, the monitoring device 704 can ping the receivers (e.g., first receiver 712, second receiver 722) at a predefined regular interval. After the transition, the monitoring device 704 can save (e.g., save in the memory of the monitoring device) and/or communicate (e.g., communicate to a central server) information associated with the transition.

Figure 8:
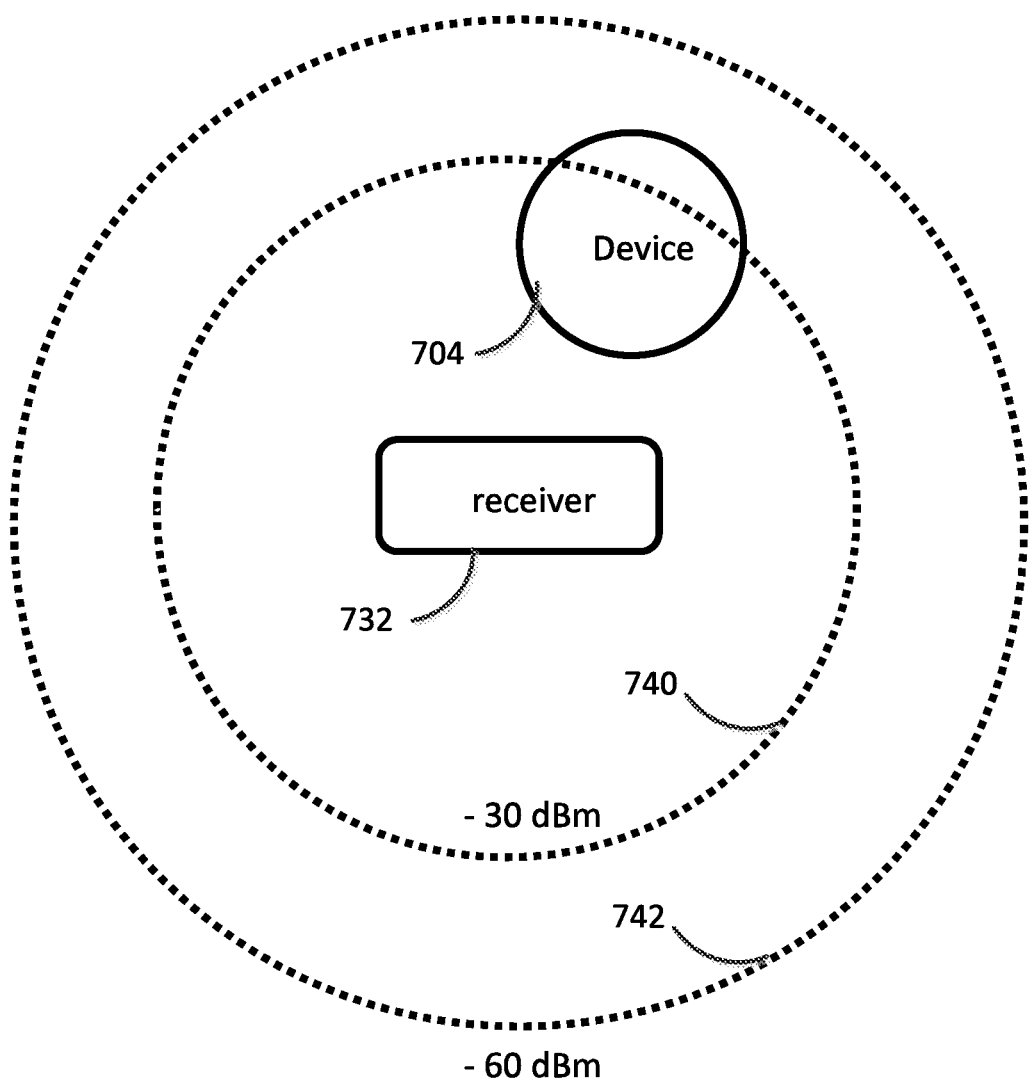
FIG. 8 illustrates location dependent attenuation of wireless signal strength between a receiver and a monitoring device.

In some embodiments, the monitoring device 704 can determine its location with respect to a receiver based on the short-range wireless communication between them. If the location of the receiver is known, the tracking system can determine the absolute location of the receiver, for example, location of the receiver on a map. From the known location of the receiver, the location of the device 704 can be determined by a relative offset of the position values. As illustrated in FIG. 8, the short-range wireless signal associated with the receiver 732 attenuates depending on the distance from the receiver 732. For example, the short-range wireless signal can attenuate by −30 dBm at a first perimeter 740, and by −60 dBm at the second perimeter 742. If the monitoring device 704 detects an attenuation of the short-range wireless signal by −30 dBm (or −60 dBm), it can determine that it is located on the first perimeter 740 (or perimeter 742). The monitoring device 704 can determine whether it is in a wireless zone of a receiver based on the strength of the short-range wireless signal. For example, the monitoring device 704 can be configured to determine that it is not in the wireless zone of the receiver 732 if the strength of the wireless signal falls below −30 dBm. As a result, when the monitoring device 704 travels beyond a perimeter 740, it can determine that it is no longer in a wireless zone and take an appropriate action (e.g., communicate this information to a user device using GSM, periodically search for another short-range wireless communication network, and the like).

The monitoring device 704 can be used to track a movable object (e.g., guitar) and alert a designated user (e.g., owner of the valuable object) of an event (e.g. tampering, theft, loss and the like). An individual (e.g., a designated user of the monitoring system) can be notified through a central notification system. The central notification system can operate from a device of the monitoring system (e.g., receiver, central server, and the like) or can be distributed over several devices. For example, the receivers (e.g., smartphones, computers, tablets, and the like) can alert designated users of the occurrence of a predetermined event. The predetermined event can include information related to the location of the monitoring device (e.g., the wireless zone in which the monitoring device is located, details of the motion of the monitoring device such as direction and speed of the motion, distance of the monitoring device from the receiver, and the like). The designated user can manage the users who will receive a notification from the central notification signal. The designated user can also enable new events that will result in a notification. The central notification system can be configured to disable the notification feature when the monitoring device is in a designated wireless zone. Once the monitoring device exits the wireless zone, the notification feature can be automatically enabled. For example, a valuable with a monitoring device can be located at a designated user's home. When the designated user is at or near home, the monitoring device enters the wireless zone associated with a receiver (e.g., cell phone, laptop, and the like), and therefore the notification feature of the monitoring system is disabled. When the designated user leaves the home, the monitoring device exits the wireless zone and the notification feature is enabled. If an event (e.g., movement of the monitoring device) occurs when the designated user is not at/near home, the designated user is notified. Notification can also be sent based on the distance between the monitoring device and the receiver that can be determined, for example, based on the strength of wireless signal. The notification feature can be disabled when the strength of the wireless signal is above a predetermined threshold value. The designated user can change the value of the threshold signal strength, and alter the size of the wireless zone outside which the notification feature is enabled. The notification feature, for example, of certain events, or during certain time duration, can be disabled. The central notification system can send a notification via an email, push notification, SMS, phone call and the like. The central notification can be configured to include a security feature that, for example, notifies law enforcement or security personnel when a certain event is detected.

In one implementation, the monitoring device can provide motion triggered alert notification. The monitoring device can be attached to an object (e.g., by magnet, tacky mount, and the like), and can include an accelerometer (e.g., 3-axis accelerometer) to detect a motion associated with the object and a rechargeable battery to power the monitoring device. The monitoring device can operate in multiple operational states that have different power requirements. The processor in the monitoring device can determine the operational state based on the desired objective of the monitoring device and/or optimization of power consumption. An operational state can be based on state logic configured to detect and communicate information related to the motion of the monitoring device using a technique related to the operational state. For example, an operational state can include a communication state (e.g., communication state based on Bluetooth, Wi-Fi, cellular, and the like) and/or a position locating state (e.g., position location state based on a 9 DoF IMU Kalman Filter, 3 DoF IMU Kalman Filter, 6 DoF IMU dead reckoning, Short-range wireless positioning, GPS, GPS combined with Kalman Filter, and the like). When the accelerometer detects a motion, the monitoring device transitions from a sleep state to a short-range wireless communication state. In the short-range wireless communication state, the monitoring device attempts to connect with a predetermined receiver using short range communication protocol. If a connection is established, the monitoring device can inform the receiver that a motion has been detected. If a predetermined receiver is not available, the monitoring device can cache data related to the detected motion (e.g., store the motion data in a memory in the monitoring device), and return back to sleep state. The monitoring device can periodically transition to the short-range wireless communication state until a predetermined receiver is detected and notified.

A central notification system can collect the detected motion data from the predetermined receiver and notify a designated user of the monitoring system of the detected motion. The designated user can establish a criteria (e.g., criteria of notification events, time and frequency of notification signal, and the like) based on when they receive a notification. For example, the notification criteria can include a geo fence such that an event (e.g., motion, change in wireless connectivity) detected in the geo fence is either notified or ignored.

Notification criteria can include information related to the wireless connection between the monitoring device and a predetermined receiver. For example, a notification signal can be sent to the designated user when the short-range wireless connection between a monitoring device and a predetermined receiver is established (e.g., monitoring device in a wireless zone of a receiver wakes up, monitoring device enters a wireless zone, and the like) and/or terminated (e.g., the monitoring device transitions to a sleep state, the monitoring device exits a wireless zone, and the like). Notification criteria can include a duration filter. For example, a notification is sent when an event (e.g., motion of the monitoring device, connection to a wireless network), last for a certain duration of time (e.g., 10 seconds). Notification alerts can be "snoozed" or temporarily disabled. The central notification system can be configured to transmit notification signal when a predetermined combination event criteria are satisfied. For example, a notification can be sent when the monitoring device moves in a predetermined motion pattern while wirelessly connected to a predetermined receiver. The monitoring system can be trained to recognize the predetermined motion. In another embodiment, notification criteria can be based on external data collected by the monitoring system (e.g., from World Wide Web). For example, if the crime data of a neighborhood suggests an increase in crime rate, the notification criteria of a monitoring system monitoring a valuable in the referenced neighborhood can be changed.

FIG. 9 illustrates a table with examples of events, the operational state of the monitoring device after the event, description of the event and the operational state, and the notification signal related to the event transmitted by the central notification system.

In another embodiment, the monitoring device can be configured to monitor a location of an object. In this embodiment, the monitoring device wakes up from a sleep state upon the detection of an event (e.g., motion, lapse of a certain time duration, and the like). It can then attempt to determine its position through various position locating states (e.g., position location state based on 9 DoF IMU Kalman Filter, 3 DoF IMU Kalman Filter, Short-range wireless positioning, GPS, GPS combined with Kalman Filter, and the like). It can start with the position locating state with lowest power consumption (e.g., 9 DoF IMU with Extended Kalman Filter (EKF)). If the detected motion does not satisfy the predetermined motion criteria, the monitoring device can transition back to sleep state. If the detected motion satisfies a predetermined motion criteria (e.g., the distance travelled by the monitoring device, pattern of motion, and the like), the monitoring device can transition to a higher energy consuming position locating state (e.g., wireless zone positioning using short-range communication protocol) to determine whether the monitoring device is in a "safe zone" (e.g., wireless zone of a predetermined receiver). If a "safe zone" is detected, the monitoring device can transition back to sleep state. If not, the monitoring device can transition to a higher energy consuming position locating state (e.g., position locating using GPS, GPS combined with EKF). If the position of the monitoring device is determined, the monitoring device can transition to a communication state based on long-range wireless communication protocol (e.g., GSM). Information related to the detected event (e.g., motion, location, and the like) is transmitted to the central server via a cellular network. If the detected motion of the monitoring device ends, the monitoring device can transmit its location and transition back to sleep state. If the monitoring device is continuously moving, it can periodically wake up, detect and transmit the event information and transition back to sleep. If a position locating state with lower power consumption becomes available (e.g., when the monitoring device enters a wireless zone of a predetermined receiver), the monitoring device can transition to the lower power consuming state. The central notification system can alert designated users of the monitoring system with information received by the central server from the monitoring device. As described above, the designated user can establish notification criteria based on the location of the monitoring device, nature of the detected event, and the like.

FIG. 10 illustrates a table that describes some examples of events, the operational state of the monitoring device after the event, description of the event and the operational state, notification signal generated by the central notification signal based on the event and the status of the monitoring device.

Figure 11:
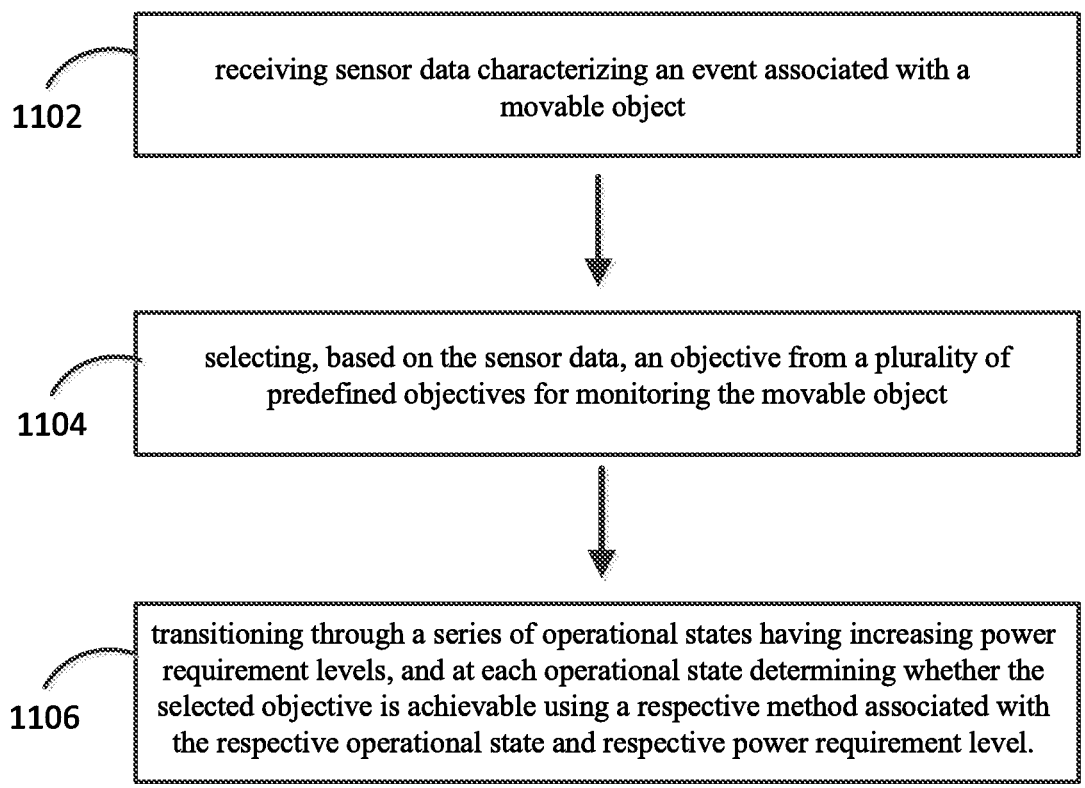
FIG. 11 is a flowchart illustrating a method of operating a monitoring device.

FIG. 11 is a flowchart that illustrates a method of intelligent power management of a monitoring device consistent with an implementation. The method includes receiving sensor data characterizing an event associated with a movable object 1102. The method also includes selecting, based on the sensor data, an objective from a plurality of predefined objectives for monitoring the movable object 1104. The method further includes transitioning through a series of operational states having increasing power requirement levels, and at each operational state determining whether the selected objective is achievable using a respective method associated with the respective operational state and respective power requirement level 1106.

Figure 12:
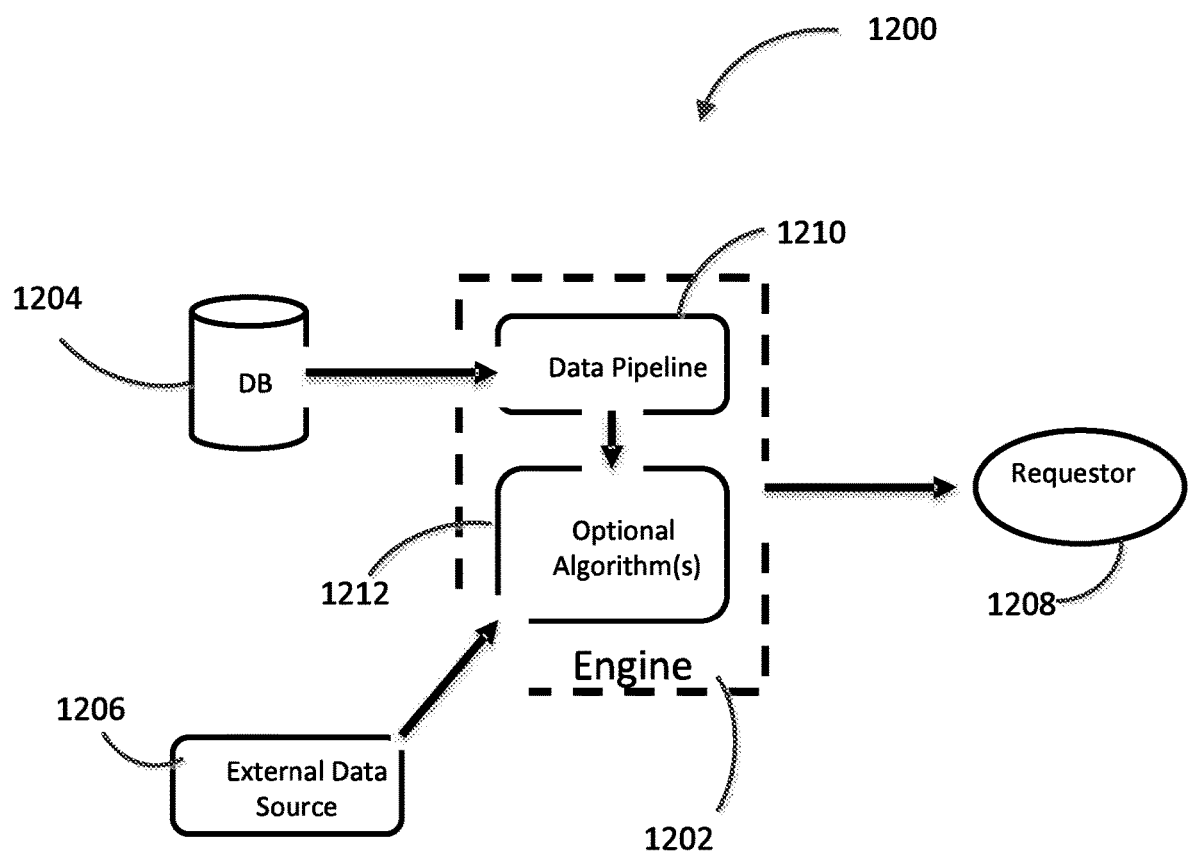
FIG. 12 illustrates an analytics system.

The monitoring system can include a database to save data related to events and physical properties detected by the monitoring device, the issued notifications, preferences of designated users of the monitoring system, and the like. The database can be located, for example, in the central server of the monitoring system. The monitoring system can include an analytics engine that can process the data in the database. FIG. 12 illustrates an analytics system 1200 comprising an analytic engine 1202 and a database 1204.

The purpose of the analytics system is to better the understanding of users and objects. It can be based on the humidity, temperature, impact, and motion of individual moveable objects that are being tracked by the monitoring system. The analytics system can also be used to gather information on, and make predictions about the environment of the object. For example, the analytics system can be used to determine the efficiency of home insulation/air conditioning/heating systems. Using data from sensors attached to the individual moveable object (e.g., valuable) and user submitted data (user & object profiles), the analytics engine can better understand the users and the objects. The engine 1202 can provide an access point to securely access the data in the database 1204. The data provided can be segmented based on the requirements of a requestor 1208. For example, a requestor may only access specific data in the database (e.g., data related to the requester's company). The engine 1202 supports the ability to add various algorithms combining multiple different data types or even sources on top of the pipelines. For example, a "car-fax" report can be generated for an object, given a profile detailing its type, make, model, and the like, its history of usage and exposure to environmental effects culminating in an approximation of its monetary value. Algorithms can be created to calculate abstracted and aggregated data, for example, all objects currently in a dangerous environmental condition. In addition to data collected within the platform of the analytics engine, outside data sources 1206 can be connected for use within algorithms. For example, environmental data can be overlaid on-top of localized weather data to view micro-climates and how weather patterns affect the value of objects. In all use cases, data can be segmented by the requestor's type. The resulting data from an algorithm can be displayed in any number of ways, such as a graph or pdf report, downloaded such as in the form of a csv file, or connected as a data stream to a user's own system. Requestor types are most commonly the company who created the initial sale of the sensor/hardware, often with their own hardware or co-branded hardware. This sensor can then be used with the software platform to provide a common customer interface, platform, and logic. The requestor 1208 can in turn access the customer's data securely through the analytics engine.

In one embodiment of the analytics engine, a third party can access limited customer data set. In this embodiment, the third party (e.g., company X) established a relation with a customer through a sales of their sensors. The sensors utilize a database that supports the analytics engine. The third party can use the analytics engine as a data pipeline to securely access only their customer's sensor's specific data. The analytics engine recognizes the third party's requestor's type and segments the data on behalf of the requestor, providing a secure access point to the data pipeline. The requesting third party can then setup their own data visualization platform for analyzing and displaying metrics. The pipeline may be throttled if needed to limit bandwidth or data transfer fees. A pipeline connection can be a mirrored segmented micro database with access credentials specific to the requestor. The analytics engine can also determine various information from customer data sets of multiple customers. For example, the analytics engine can correlate information of customers who are a part of more than one customer data set.

One implementation of the analytics engine can include a dashboard data visualization system which can include custom algorithms. In this embodiment, the customer may have acquired the third party's sensor. The third party may want to access not only the data associated with the sold sensors, but would like to add some algorithms to process the aforementioned data that may provide insight into the customers. The third party can select from existing algorithms or even add their own to the analytic engine. The third party can choose whether they would like to receive the output as a data pipeline for their own data visualization software or utilize the Engine's built in visualizations. The analytic engine can connect their segmented data stream along with any additional third party data streams to the selected algorithm(s) producing the required output. For example, the third party can determine wear and tear of objects based on motion, change in temperature/humidity and the like, and correlate the wear and tear information with the value of the object. In another aspect, the wear and tear information can be correlated with service request data to determine the quality of care provided by the customer to the object.

Figure 13:
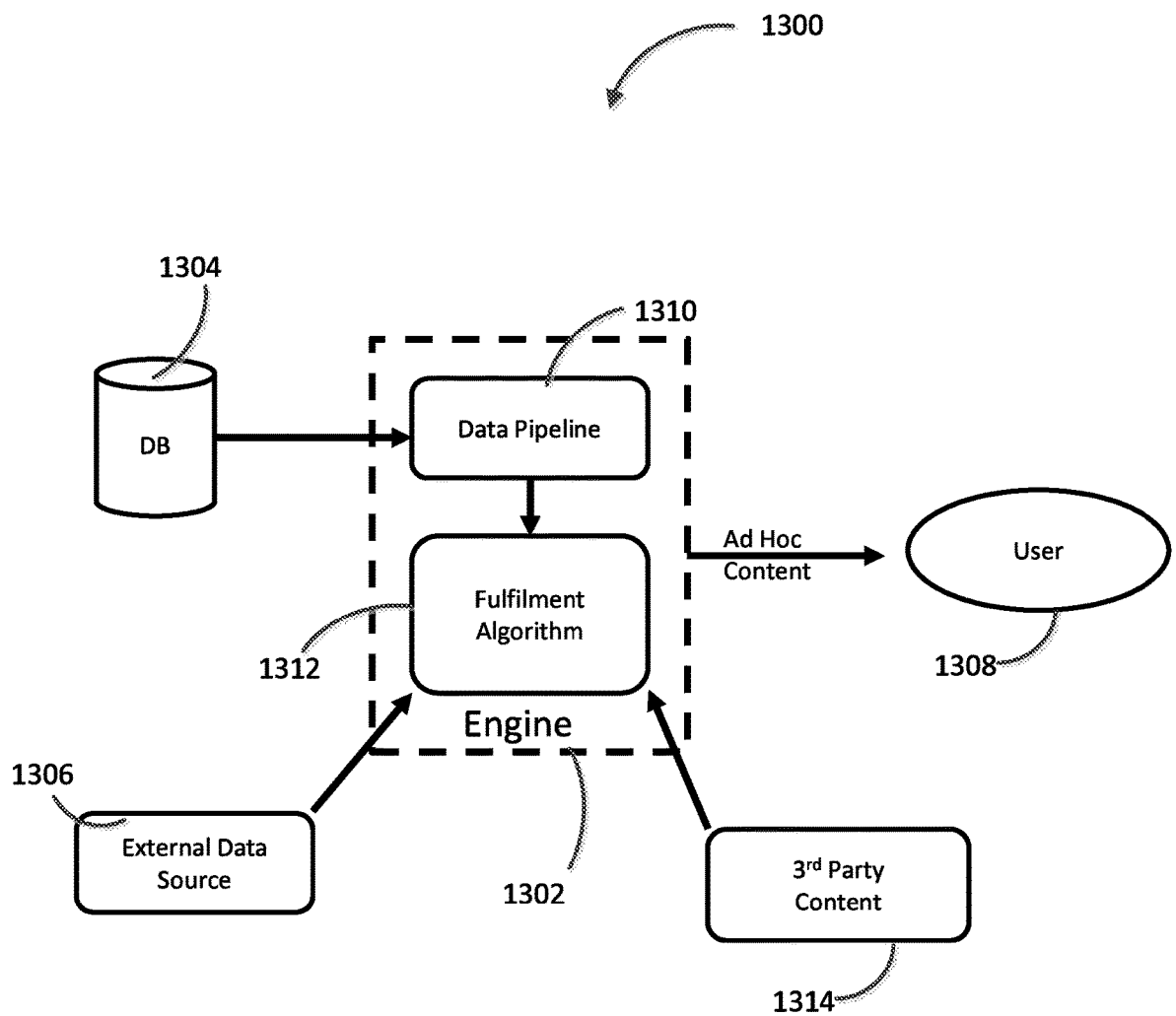
FIG. 13 illustrates a content delivery system.

FIG. 13 illustrates an example of a content delivery system for delivery of digital content. Digital content can be recommended to a user based on the user's behavior and history, or based on current trends, or provided directly to the user digitally. Digital content can be provided wirelessly through applications (mobile or web), email, or other mediums based on the preference of the user. Digital content can be in the form of educational, informative, or promotional material. The content can be created and hosted by a third party and delivered to the user through the platform. Utilizing the analysis of customer data by the analytic engine 1302, digital content is chosen and directed to the customer. The digital content can be chosen based on an existing problem of the customer or in anticipation of a problem that the customer may experience in the future. The digital content can be automatically selected or targeted specifically using the analytics engine. For example, based on an upcoming cold weather front, all data objects related to cold weather conditions can have a tutorial popup inside of the application explaining how to prepare their valuables for the cold. Just as digital content can be delivered on demand based on user and object data, so can physical goods. A user can register with a physical good renewal service with a credit card, where based on an object's state through humidity, temperature, impact, or motion a product can be either recommended or automatically ordered and sent to the user's location. For example, a user's object's relative humidity starts to rise and trend towards a dangerous level. Before the level is reached, a desiccant pack is ordered on their behalf and shipped to the object's location preventing irreversible damage. Like the digital content, the physical content is typically hosted by a $3^{rd}$ party and simply provided using the platform. In all cases, digital or physical, goods/content is delivered ad-hoc driven by user and object behavior data from humidity, temperature, impact and motion. This data can also be combined with profile data and external data sources through the analytics engine, for example, to predict the time for replacement of strings of a guitar.

In another embodiment of digital goods content delivery, a customer can agree to receive promotions and educational information. The customer's object undergoes wear and tear due to daily use, their application can notify the customer that they should clean their object. Upon initiating the cleaning process, the application can provide the customer with proper cleaning techniques through online tutorials (e.g., video, audio tutorials, written instructions on a website). The user can resume using their object for a designated period of time (e.g., 30 days), and can be prompted once again at the end of the designated period. The content delivery system can be configured to provide necessary information to the user. For example, since, the user has already been taught how to do so; a tutorial may not be presented. If the user damages the object (e.g., by dropping the object), the application alerts the user of the damage and provide necessary help (e.g., present to the user repair options). The application can also provide the user with coupons/discount offers at nearby repair shops.

In another embodiment of physical goods content delivery, a customer may have signed up for automatic renewal of desiccant packs for their object. A sensor monitoring the object can detect an upward drift in the humidity. The application can alert the customer of the aforementioned problem, and automatically order a desiccant pack within a certain period of time of detection of the problem (e.g., seventy two hours). Upon arrival of the desiccant pack at the object's location the customer can swap out the old pack and replaces it with the new one by following digitally delivered instructions. The sensor detects that the problem has been resolved, and can notify the customer.

Although a few variations have been described in detail above, other modifications or additions are possible. For example, in one aspect, the monitoring system can be used to determine the location of a device having a globally unique serial number/mac address that can be accessed wirelessly. A receiver with a location detection software can be registered with a central notification service. The receiver can scan at varying intervals, for example, at regular intervals or based on user behavior. Any time the device passes through the wireless range of the receiver, the receiver's location, the relative signal strength, the time, and the unique mac address of the device are reported anonymously and securely to the central notification service. In addition to this, the mac address of the receiver can be tracked by the central notification system. The central notification system can request receivers near the device to start scanning at varying intervals which can be based on, for example, speed and direction of the device being tracked. The speed and direction of the device is determined based on how the device moves in relation to the receivers and each receiver's location. For example, if a device being tracked is near a receiver to start, all other receivers within 1000 ft. can be configured to start scanning at varying speeds inversely proportional to how far away from the initial receiver they are. Receiver zones can overlap and a device can be within multiple zones to create a triangulation effect. As the device moves between receivers a path is predicted and the number of scanning receivers is optimized to remove unnecessary scanning. The new location information is consistently sent from the receivers to the central monitoring service (location, signal strength, time, and mac address). The location of any device in the central monitoring service can then be queried, looked up, or notifications and alerts sent out when the device moves into or out of a specific location.

In another aspect, the analytics engine can act as a customer service dashboard. The analytics engine can provide historical information of an object based on which decisions can be made about the object. For example, a technician repairing a guitar that is monitored by the monitoring system can access the history of the guitar to better diagnose the problem and suggest a solution. In some implementations, the analytics system can diagnose the problem and thereby obviate the need for a technician.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving sensor data characterizing an event associated with a movable object;
   selecting, based on the sensor data, an objective from a plurality of predefined objectives for monitoring the movable object;
   transitioning through a series of operational states having increasing power requirement levels, and at each operational state determining whether the selected objective is achievable using a respective method associated with the respective operational state and respective power requirement level, wherein the selected objective comprises establishing a wireless connection with a device from a plurality of predetermined devices using a short-range wireless protocol;
   wherein at least one of the receiving, the selecting, and the transitioning is performed by at least one data processor forming part of at least one computing system; and
   notifying, by a central server in communication with the devices, a user device associated with the movable object based on a strength of the wireless connection.

2. The method of claim 1, wherein the sensor data comprises data associated with one or more of a timer, an accelerometer, a global positioning system, a position sensor, a thermometer, a humidity sensor, pressure sensor, voltage sensor, current sensor, wind speed sensor, mass spectrometer and infrared sensors.

3. The method of claim 1, wherein the event comprises one or more of end of a time duration, movement of the movable object, change in surrounding temperature, surrounding humidity and detection of chemical properties of the movable object.

4. The method of claim 1, wherein the selected objective comprises determination of a location of the movable object.

5. The method of claim 4, wherein the respective method associated with the respective operational state comprises nine-degree-of-freedom Kalman filtering, three-degree-of-freedom Kalman filtering, time of flight detection, range finding, pressure sensing, short-range wireless positioning and global positioning.

6. The method of claim 1, wherein the selected objective comprises communication of the received sensor data.

7. The method of claim 6, wherein the respective method associated with the respective operational state comprises communication using Bluetooth, WiFi, LPWAN, SigFox, RF communication protocol and/or cellular protocol.

8. The method of claim 1, wherein receiving a portion of the sensor data causes a transition from a sleep state to a communication state.

9. The method of claim 1, wherein transitioning through the series of operational states comprises transitioning between a sleep state and a communication state, wherein the communication state comprises communicating sensor data to the device.

10. The method of claim 1, wherein the selected objective further comprises determining a distance between one or more pre-determined devices and the movable object.

11. The method of claim 1, further comprising:
    searching for a predetermined device using a short-range wireless protocol,
       wherein the sensor data comprises data from a motion detector, the selected objective comprises monitoring motion of the movable object and the series of operational states comprise a sleep state, a short-range wireless communication state and a cellular communication state,
       wherein transitioning between the sleep state and the short-range wireless communication state upon receiving the data from the motion detector and transitioning between the short-range wireless communication state and the cellular communication state is based on an availability of the predetermined device;
    notifying, by a central server in communication with one of the predetermined device and the movable object, a user device with information related to the data from the motion detector.

12. The method of claim 11, wherein the short-range and cellular communication states comprise transmitting the received data from the motion detector.

13. The method of claim 11, wherein the motion detector comprises one or more of a 3 degree-of-freedom inertial measurement unit, a 9 degree-of-freedom inertial measurement unit, a limit switch, a range finder, a barometer, a gyroscope, a 1-axis accelerometer and a magnetometer.

14. The method of claim 1, comprising analyzing the received sensor data by an analytics engine to determine a behavior of the movable object.

15. The method of claim 1, wherein the selected objective comprises establishing a plurality of wireless connections with a plurality of receivers.

16. The method of claim 15, further comprising determining a location based on strengths of the plurality of wireless connections and locations of the plurality of receivers.

17. A system comprising:
    a sensor configured to generate sensor data characterizing an event associated with a movable object;
    processing circuitry configured to select, based on the sensor data, an objective from a plurality of predefined objectives for monitoring the movable object and transition through a series of operational states having increasing power requirement levels, and at each operational state determine whether the selected objective is achievable using a respective method associated with the respective operational state and respective power requirement level; and
    a radio, wherein the selected objective comprises establishing a wireless connection with a device from a plurality of predetermined devices using a short-range wireless protocol,
       wherein the processing circuitry is configured to notify, using the radio and by a central server in communication with the devices, a user device associated with the movable object based on a strength of the wireless connection.

18. The system of claim 17, wherein the sensor comprises one or more of a timer, an accelerometer, a global positioning system, a position sensor, a thermometer, a humidity sensor, pressure sensor, voltage sensor, current sensor, wind speed sensor, mass spectrometer and infrared sensors.

19. The system of claim 17, wherein the event comprises one or more of an end of a time duration, a movement of the movable object, a change in surrounding temperature, surrounding humidity, and a detection of chemical properties of the movable object.

20. The system of claim 17, wherein the respective method associated with the respective operational state comprises one or more of nine-degree-of-freedom Kalman filtering, three-degree-of-freedom Kalman filtering, time of flight detection, range finding, pressure sensing, short-range wireless positioning and global positioning.

21. The system of claim 17, wherein transitioning through the series of operational states comprises transitioning between a sleep state and a communication state, wherein the communication state comprises communicating sensor data to the device.

22. The system of claim 17, wherein the selected objective further comprises determining a distance between one or more pre-determined devices and the movable object.

23. The system of claim 17, wherein the processing circuitry is configured to search for a predetermined device using a short-range wireless protocol,
    wherein the sensor data comprises data from a motion detector, the selected objective comprises monitoring motion of the movable object and the series of operational states comprise a sleep state, a short-range wireless communication state and a cellular communication state,
    wherein transitioning between the sleep state and the short-range wireless communication state upon receiving the data from the motion detector and transitioning between the short-range wireless communication state and the cellular communication state is based on an availability of the predetermined device;
    wherein the processing circuitry is configured to notify, by a central server in communication with one of the predetermined device and the movable object, a user device with information related to the data from the motion detector.

24. The system of claim 17, wherein the selected objective comprises establishing a plurality of wireless connections with a plurality of receivers.

25. The system of claim 24, further comprising determining a location based on strengths of the plurality of wireless connections and location of the plurality of receivers.

26. A method comprising:
    receiving sensor data characterizing an event associated with a movable object;
    selecting, based on the sensor data, an objective from a plurality of predefined objectives for monitoring the movable object;
    transitioning through a series of operational states having increasing power requirement levels, and at each operational state determining whether the selected objective is achievable using a respective method associated with the respective operational state and respective power requirement level;
        wherein at least one of the receiving, the selecting, and the transitioning is performed by at least one data processor forming part of at least one computing system;
    searching for a predetermined device using a short-range wireless protocol,
        wherein the sensor data comprises data from a motion detector, the selected objective comprises monitoring motion of the movable object and the series of operational states comprise a sleep state, a short-range wireless communication state and a cellular communication state,
        wherein transitioning between the sleep state and the short-range wireless communication state upon receiving the data from the motion detector and transitioning between the short-range wireless communication state and the cellular communication state is based on an availability of the predetermined device; and
    notifying, by a central server in communication with one of the predetermined device and the movable object, a user device with information related to the data from the motion detector.

* * * * *